United States Patent
Singh et al.

(10) Patent No.: US 12,346,407 B1
(45) Date of Patent: Jul. 1, 2025

(54) SYSTEM AND METHOD FOR DATA BLOCK ANALYSIS PRIORITIZATION AND ROUTING VIA QUANTUM MACHINE LEARNING

(71) Applicant: BANK OF AMERICA CORPORATION, Charlotte, NC (US)

(72) Inventors: Shailendra Singh, Maharashtra (IN); Suresh Loganathan, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/625,526

(22) Filed: Apr. 3, 2024

(51) Int. Cl.
  *G06F 18/2321* (2023.01)
  *G06N 10/60* (2022.01)

(52) U.S. Cl.
  CPC ......... *G06F 18/2321* (2023.01); *G06N 10/60* (2022.01)

(58) Field of Classification Search
  CPC .......................... G06F 18/2321; G06N 10/60
  See application file for complete search history.

(56) References Cited

U.S. PATENT DOCUMENTS

| | | |
|---|---|---|
| 11,157,828 B2 | 10/2021 | Wiebe |
| 11,436,519 B1 | 9/2022 | Dridi |
| 11,907,347 B2 | 2/2024 | Yanamala |
| 2022/0121998 A1 | 4/2022 | McClean |
| 2022/0292377 A1 | 9/2022 | Benedetti |
| 2022/0405649 A1 | 12/2022 | Rastunkov |
| 2023/0206108 A1 | 6/2023 | Le Van Gong |
| 2023/0359922 A1 | 11/2023 | Klimov |
| 2023/0376820 A1* | 11/2023 | Mukherjee ............ G06N 10/60 |
| 2023/0419144 A1 | 12/2023 | Uno |
| 2024/0037439 A1 | 2/2024 | Werner |
| 2024/0062096 A1 | 2/2024 | Farquhar |
| 2024/0073226 A1 | 2/2024 | Ryver |
| 2024/0160979 A1 | 5/2024 | Pinho |
| 2024/0160981 A1* | 5/2024 | Kordzanganeh ....... G06N 20/20 |
| 2024/0346087 A1* | 10/2024 | Quigley ............... H04L 9/0894 |
| 2024/0428306 A1* | 12/2024 | Sliwka ................. H04L 9/0891 |

OTHER PUBLICATIONS

Cheng et al., IntStream: Towards Flexible, Expressive, and Scalable Network Telemetry, IEEE, 2022, retrieved on Feb. 25, 2025, retrieved from the Internet <URL: https://ieeexplore.ieee.org/abstract/document/9784426> (Year: 2022).*

* cited by examiner

*Primary Examiner* — Tyler J Torgrimson
(74) *Attorney, Agent, or Firm* — Moore & Van Allen PLLC; Andrew T. Wood

(57) ABSTRACT

Systems, computer program products, and methods are described herein for data block analysis prioritization and routing via quantum machine learning. The present disclosure includes retrieving distributed ledger transactions, retrieving a stream of telemetry data of computer hardware, clustering, based on the transaction metadata, the distributed ledger transactions using a clustering engine, generating, using a machine learning model, a predetermined number of transaction placement schemas of the computer hardware, determining, from a probability output by parallel simulation testing via a quantum computer, a prime schema and a configuration of the prime computer hardware, and routing, based on the prime schema, a transaction cluster to the prime computer hardware.

20 Claims, 9 Drawing Sheets

SYSTEM AND METHOD FOR DATA BLOCK ANALYSIS PRIORITIZATION AND ROUTING VIA QUANTUM MACHINE LEARNING

TECHNOLOGICAL FIELD

Example implementations of the present disclosure relate to a system and method for data block analysis prioritization and routing via quantum machine learning.

BACKGROUND

Blockchain technology has revolutionized various industries by providing a decentralized and secure method for recording transactions. However, one of the key challenges facing blockchain systems is the latency in the block mining process. This latency arises due to the limited capacity of blocks, resulting in delays when the system is inundated with transactions. As only a finite number of transactions can be confirmed into a block, excess transactions are either queued or discarded from miners' transaction pools, leading to inefficiencies in the network. Thus, there exists a pressing need for the development of a technical procedure capable of expediting and optimizing the blockchain mining process, thereby mitigating the time required to add blocks to the blockchain.

BRIEF SUMMARY

Systems, methods, and computer program products are provided for data block analysis prioritization and routing via quantum machine learning.

In one aspect, a system for data block analysis prioritization and routing via quantum machine learning is presented. The system including a processing device, a non-transitory storage device containing instructions when executed by the processing device, causes the processing device to perform the steps of retrieving a plurality of distributed ledger transactions including transaction metadata, retrieving, continuously, a stream of telemetry data of computer hardware in a network via an API call to a telemetry database, wherein the computer hardware may include distributed mining pools, clustering, based on the transaction metadata, the plurality of distributed ledger transactions into a plurality of transaction clusters using a clustering engine, wherein the clustering engine determines a priority score for at least one transaction cluster of the plurality of transaction clusters, generating, using a machine learning model, a predetermined number of transaction placement schemas of the computer hardware, determining, from a probability output by parallel simulation testing via a quantum computer, a prime schema including prime computer hardware and a configuration of the prime computer hardware, and routing, based on the prime schema, the at least one transaction cluster of the plurality of transaction clusters to the prime computer hardware.

In some implementations, the quantum computer may include a photonic quantum computer.

In some implementations, the instructions further cause the processing device to perform the steps of determining, continuously at a predetermined interval, from a second probability output by parallel simulation testing via the quantum computer, a new schema including new computer hardware and a configuration of the new computer hardware.

In some implementations, the instructions further cause the processing device to perform the steps of determining, upon a condition where transaction volume is above a predetermined threshold, from a second probability output by parallel simulation testing via the quantum computer, a new schema including new computer hardware and a configuration of the new computer hardware.

In some implementations, the instructions further cause the processing device to perform the steps of mining, at the prime computer hardware, the at least one transaction cluster of the plurality of transaction clusters, collecting, via a monitoring engine, monitoring data including a disposition of the at least one transaction cluster of the plurality of transaction clusters, and transmitting the monitoring data to the machine learning model for training.

In some implementations, the plurality of distributed ledger transactions may include a distributed ledger transaction stream.

In some implementations, the telemetry data is at least one selected from the group consisting of geolocation, IP address, computing capability metadata, and computing hardware availability temporal telemetry.

In some implementations, the instructions further cause the processing device to perform the steps of forming, based on the prime schema, a smart contract between the prime computer hardware and the at least one transaction cluster of the plurality of transaction clusters.

In another aspect, a computer program product for data block analysis prioritization and routing via quantum machine learning is presented. The computer program product including a non-transitory computer-readable medium including code causing an apparatus to retrieve a plurality of distributed ledger transactions including transaction metadata, retrieve, continuously, a stream of telemetry data of computer hardware in a network via an API call to a telemetry database, wherein the computer hardware may include distributed mining pools, cluster, based on the transaction metadata, the plurality of distributed ledger transactions into a plurality of transaction clusters using a clustering engine, wherein the clustering engine determines a priority score for at least one transaction cluster of the plurality of transaction clusters, generate, using a machine learning model, a predetermined number of transaction placement schemas of the computer hardware, determine, from a probability output by parallel simulation testing via a quantum computer, a prime schema including prime computer hardware and a configuration of the prime computer hardware, and route, based on the prime schema, the at least one transaction cluster of the plurality of transaction clusters to the prime computer hardware.

In some implementations, the quantum computer may include a photonic quantum computer.

In some implementations, the code further causes the apparatus to determine, continuously at a predetermined interval, from a second probability output by parallel simulation testing via the quantum computer, a new schema including new computer hardware and a configuration of the new computer hardware.

In some implementations, the code further causes the apparatus to mine, at the prime computer hardware, the at least one transaction cluster of the plurality of transaction clusters, collect, via a monitoring engine, monitoring data including a disposition of the at least one transaction cluster of the plurality of transaction clusters, and transmit the monitoring data to the machine learning model for training.

In some implementations, the plurality of distributed ledger transactions may include a distributed ledger transaction stream.

In some implementations, the telemetry data is at least one selected from the group consisting of geolocation, IP address, computing capability metadata, and computing hardware availability temporal telemetry.

In some implementations, the code further causes the apparatus to form, based on the prime schema, a smart contract between the prime computer hardware and the at least one transaction cluster of the plurality of transaction clusters.

In yet another aspect, a method for data block analysis prioritization and routing via quantum machine learning is presented. The method including retrieving a plurality of distributed ledger transactions including transaction metadata, retrieving, continuously, a stream of telemetry data of computer hardware in a network via an API call to a telemetry database, wherein the computer hardware may include distributed mining pools, clustering, based on the transaction metadata, the plurality of distributed ledger transactions into a plurality of transaction clusters using a clustering engine, wherein the clustering engine determines a priority score for at least one transaction cluster of the plurality of transaction clusters, generating, using a machine learning model, a predetermined number of transaction placement schemas of the computer hardware, determining, from a probability output by parallel simulation testing via a quantum computer, a prime schema including prime computer hardware and a configuration of the prime computer hardware, and routing, based on the prime schema, the at least one transaction cluster of the plurality of transaction clusters to the prime computer hardware.

In some implementations, the quantum computer may include a photonic quantum computer.

In some implementations, the method further including determining, continuously at a predetermined interval, from a second probability output by parallel simulation testing via the quantum computer, a new schema including new computer hardware and a configuration of the new computer hardware.

In some implementations, the method further including mining, at the prime computer hardware, the at least one transaction cluster of the plurality of transaction clusters, collecting, via a monitoring engine, monitoring data including a disposition of the at least one transaction cluster of the plurality of transaction clusters, and transmitting the monitoring data to the machine learning model for training.

In some implementations, the telemetry data may be at least one selected from the group consisting of: geolocation, IP address, computing capability metadata, and computing hardware availability temporal telemetry.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
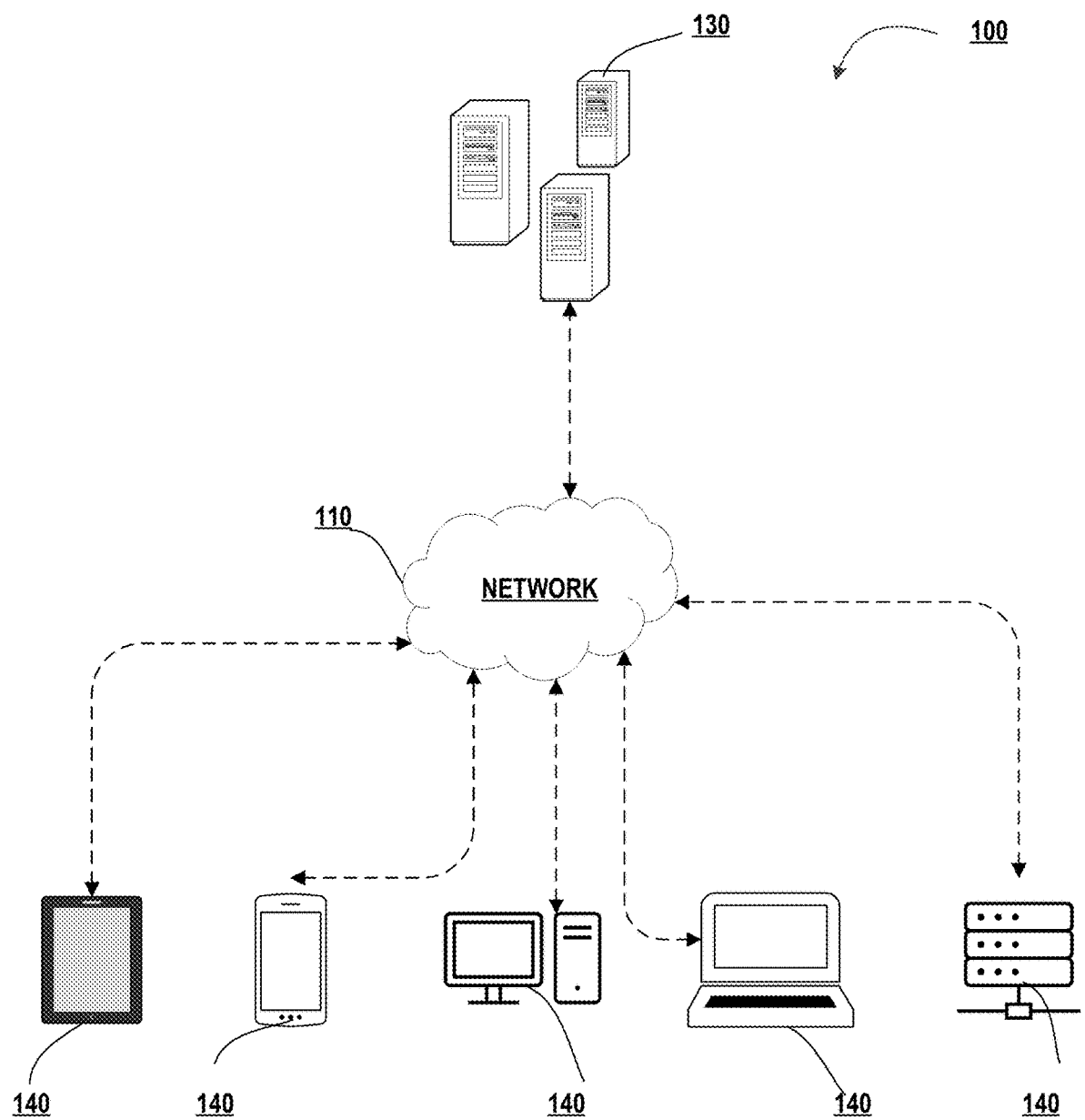
Figure 1B:
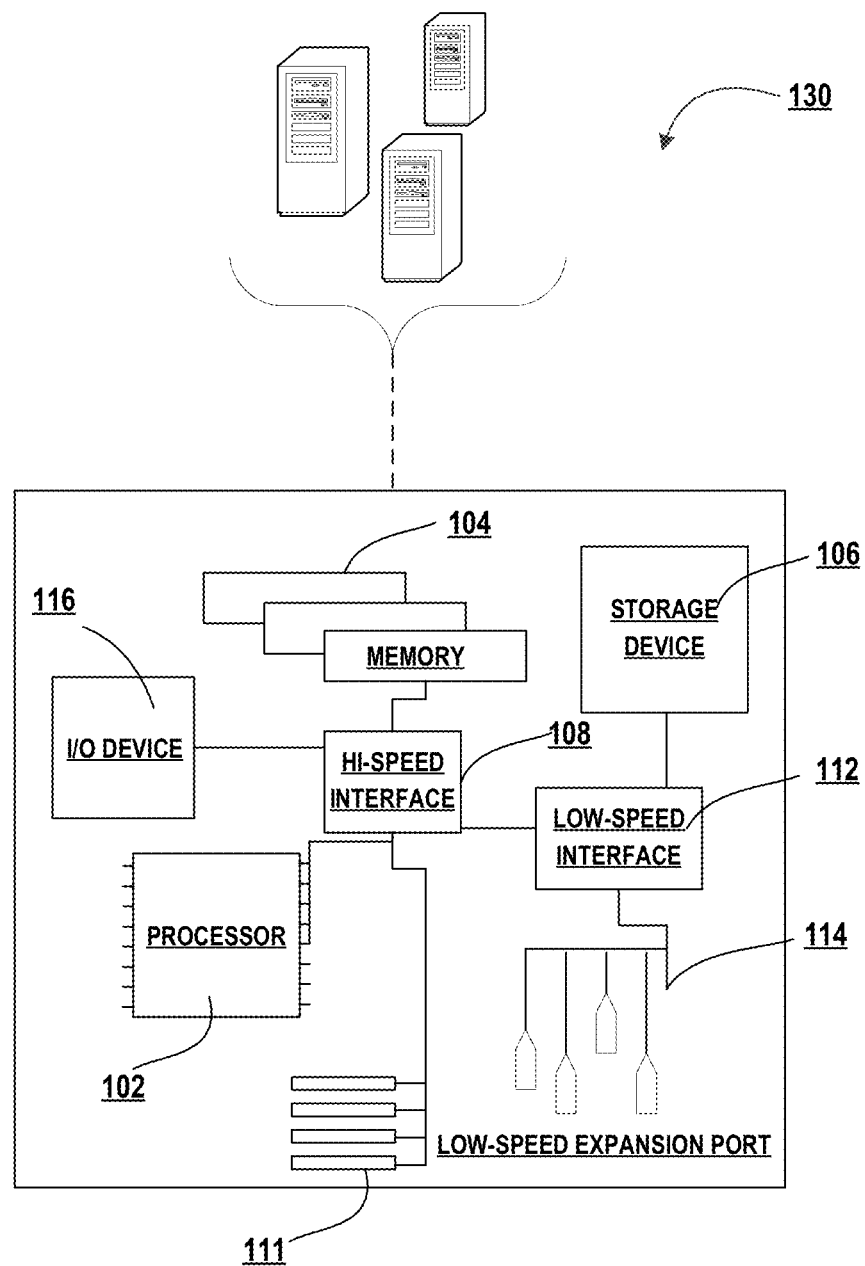
Figure 1C:
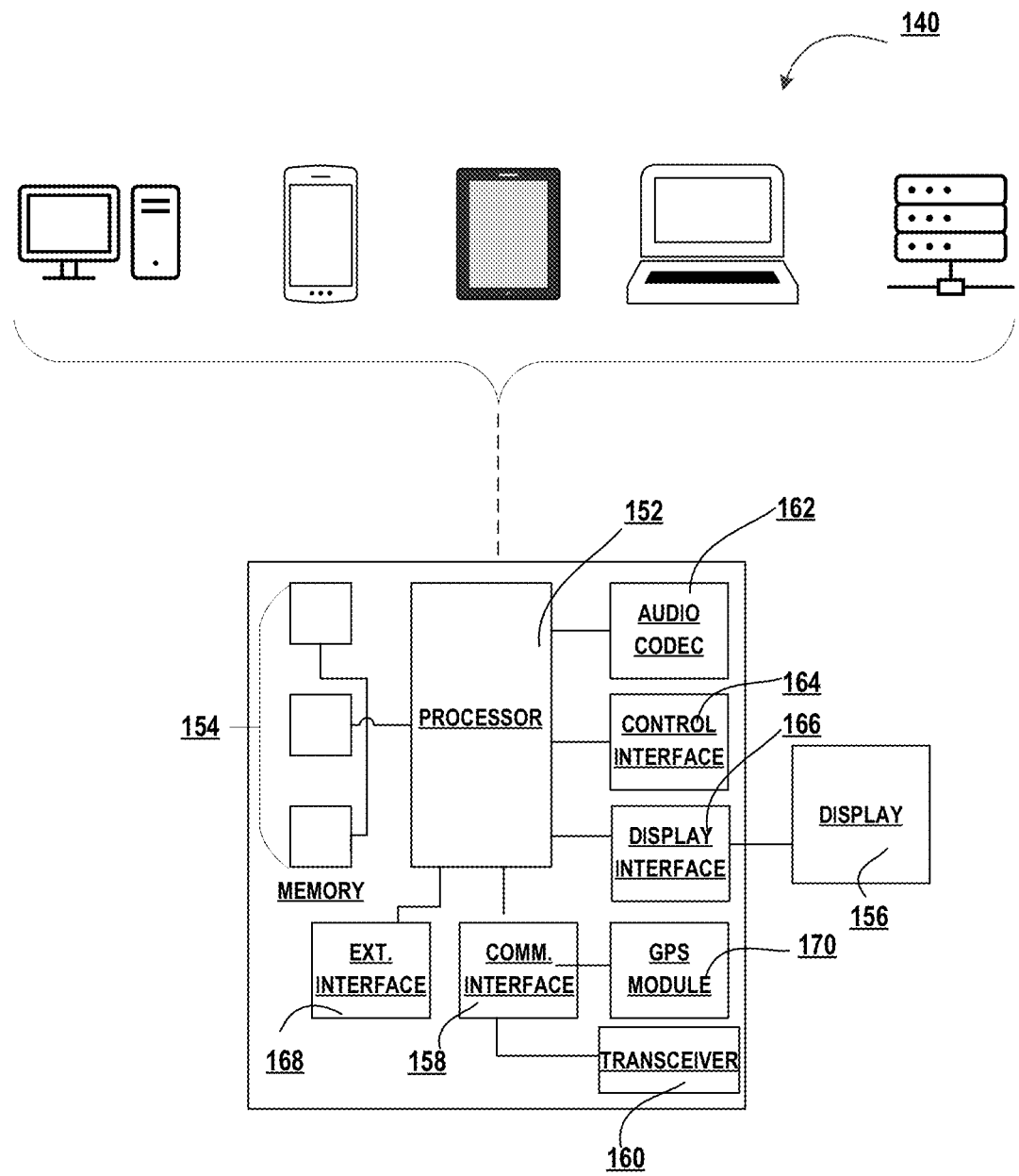
Figure 2A:
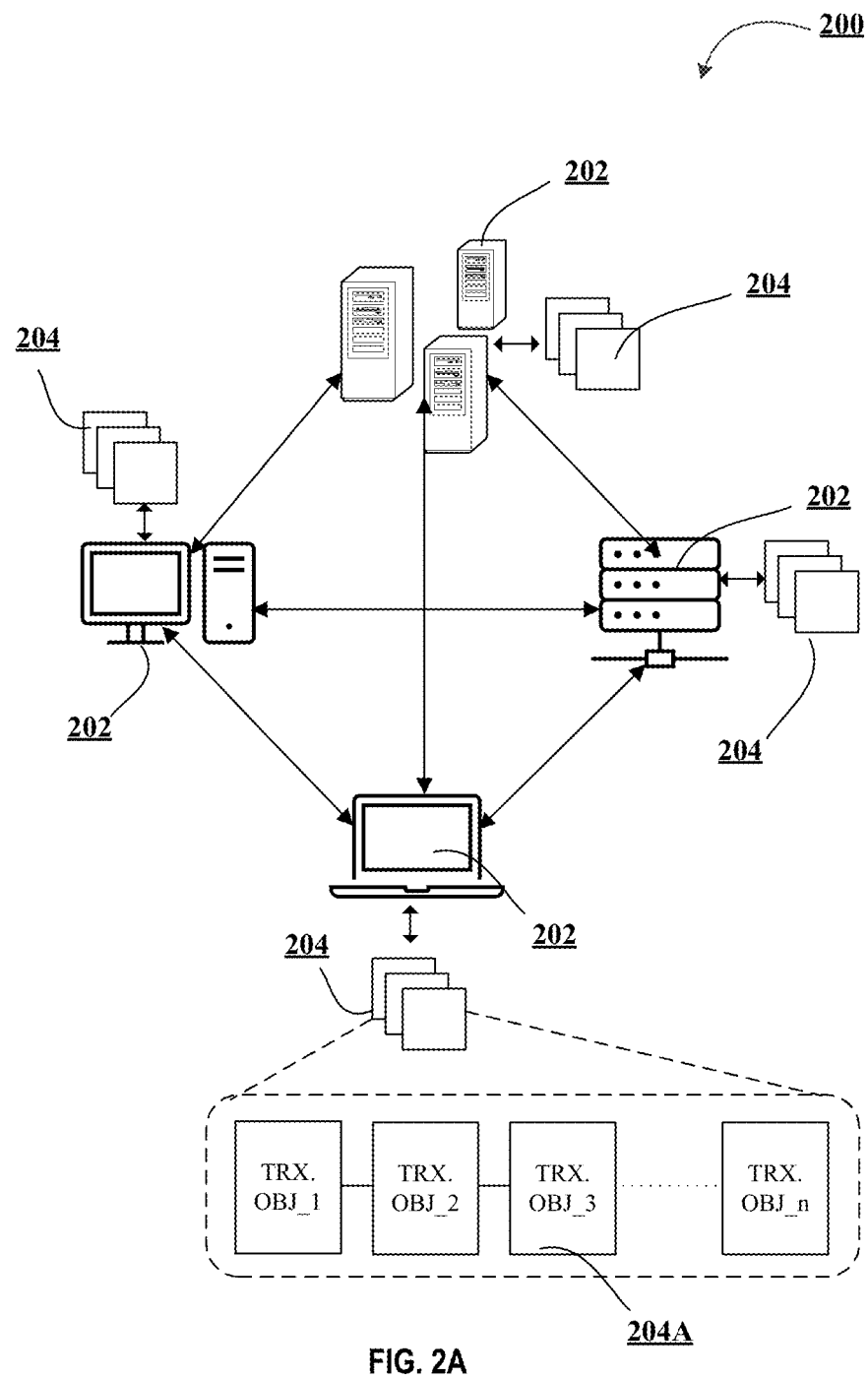
Figure 2B:
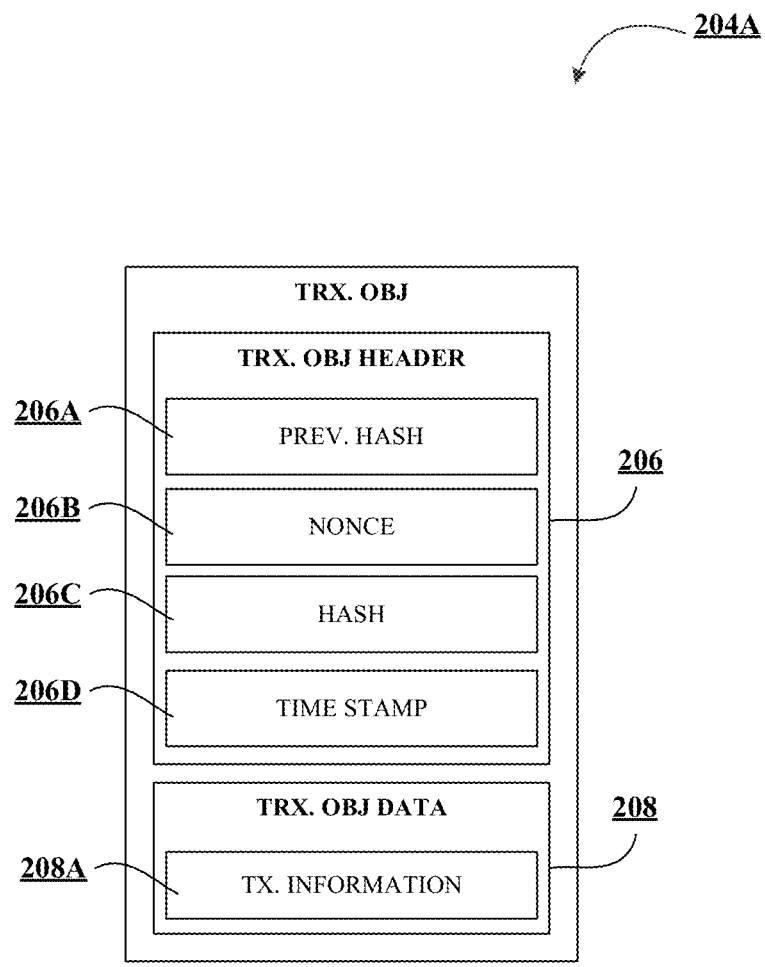
Figure 3:
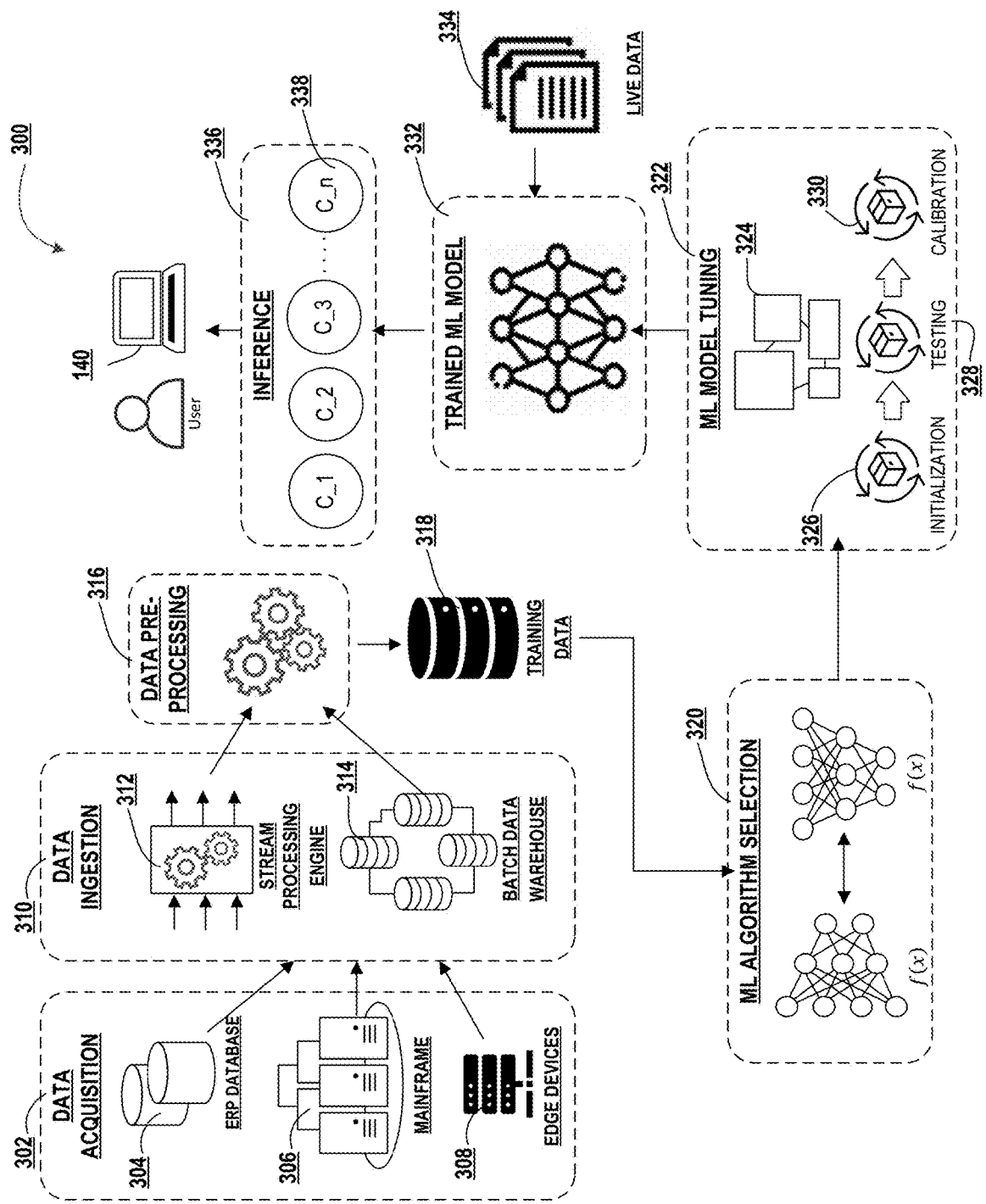
Figure 4A:
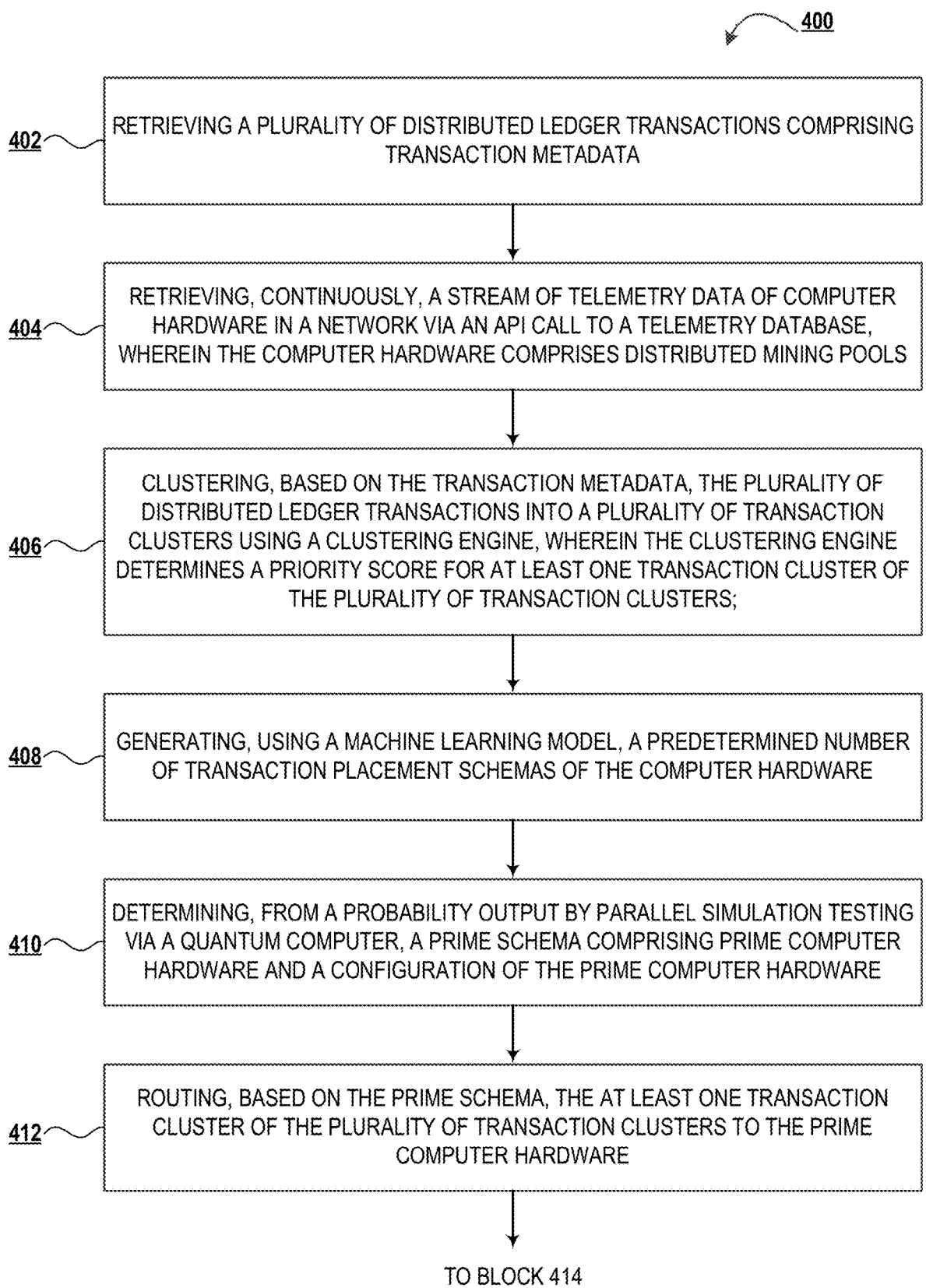
Figure 4B:
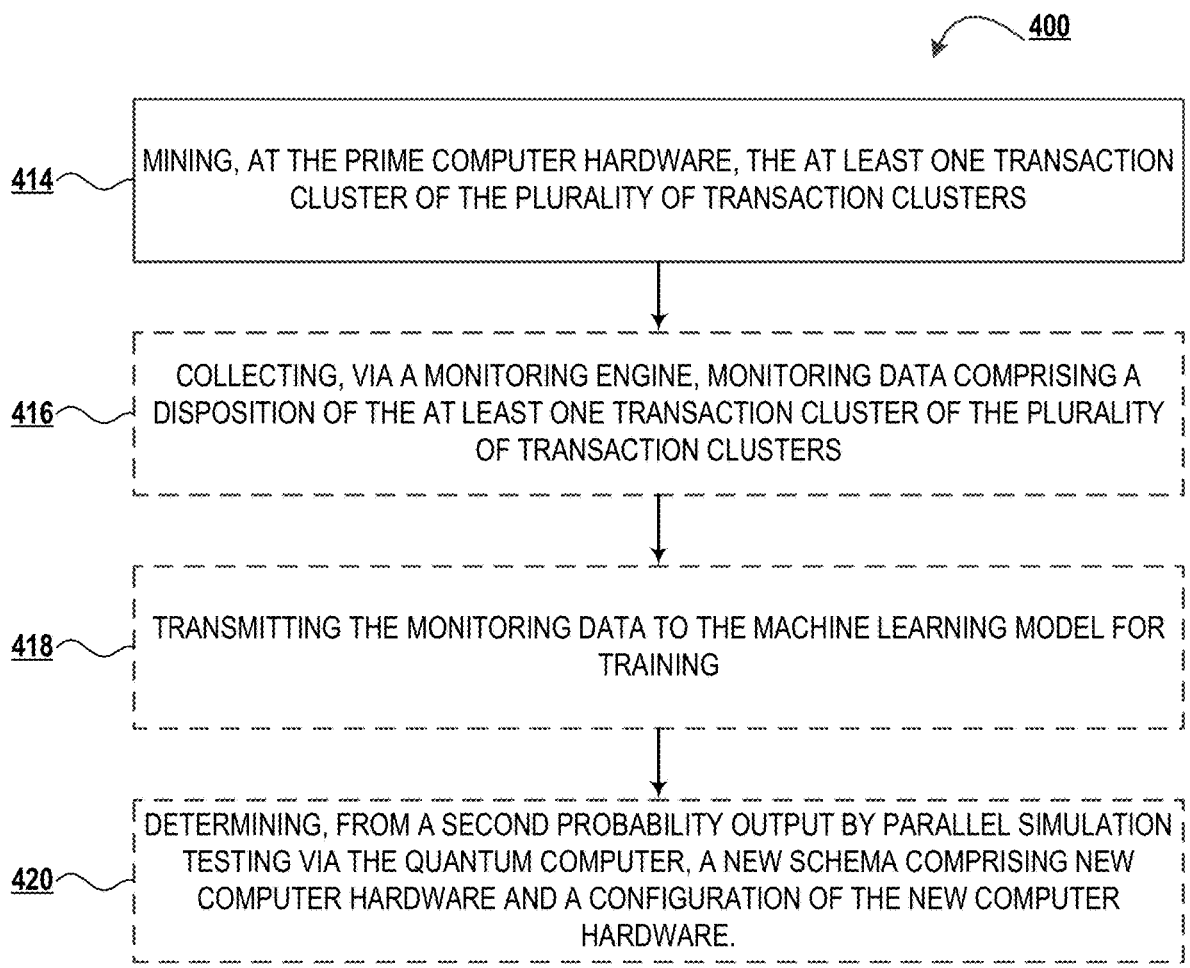
Figure 5:
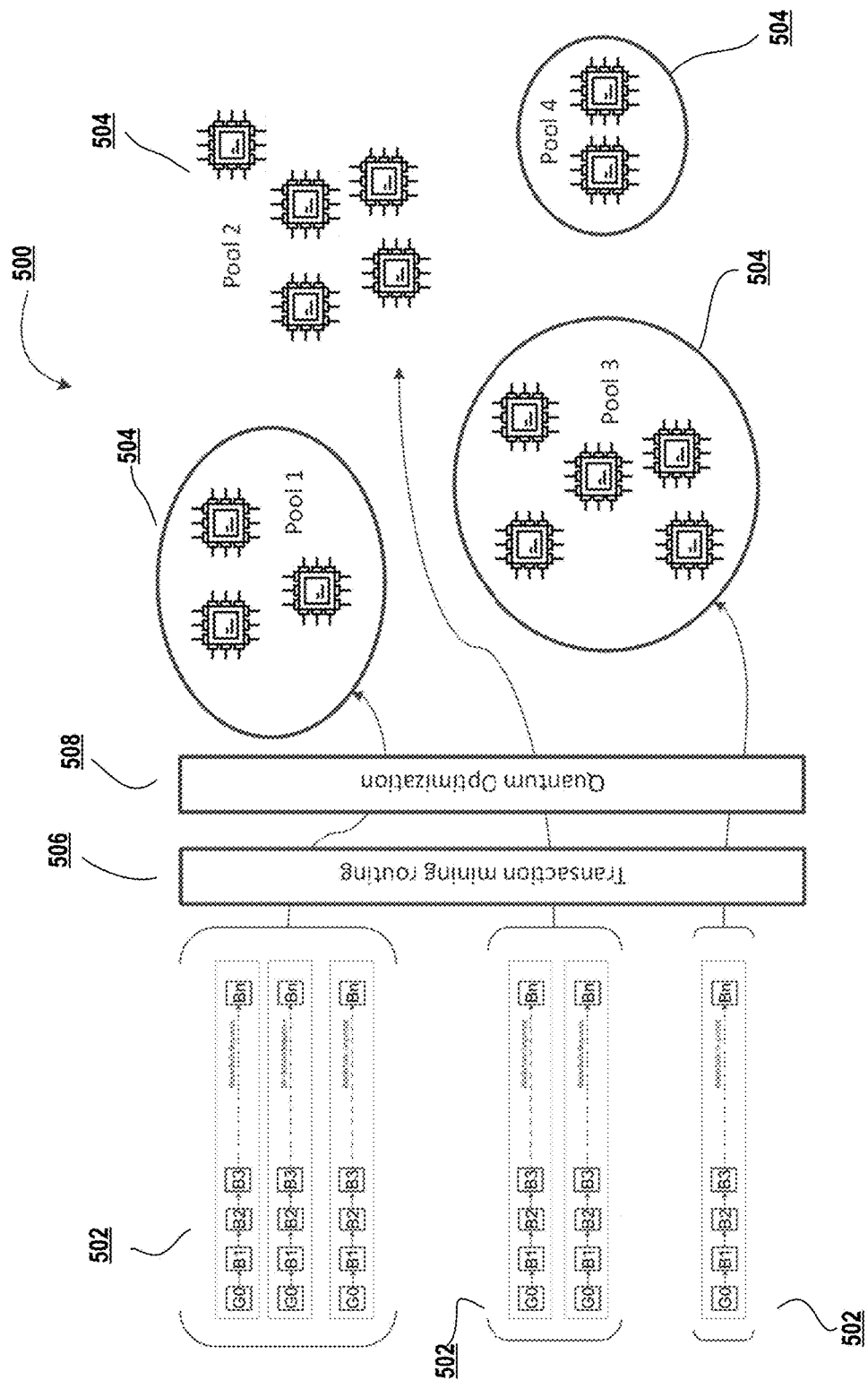

FIGS. 1A-1C illustrates technical components of an exemplary distributed computing environment for data block analysis prioritization and routing via quantum machine learning, in accordance with an implementation of the disclosure;

FIGS. 2A-2B illustrate an exemplary distributed ledger technology (DLT) architecture, in accordance with an implementation of the disclosure;

FIG. 3 illustrates an exemplary machine learning model subsystem architecture, in accordance with an implementation of the disclosure;

FIGS. 4A-4B illustrate a process flow for data block analysis prioritization and routing via quantum machine learning, in accordance with an implementation of the disclosure; and FIG. 5 illustrates a graphical representation of data block mining analysis prioritization and routing via quantum machine learning, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be embodied in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The emergence of blockchain technology has introduced transformative possibilities across various sectors, yet inherent technical limitations persist, particularly concerning latency in the block mining process. This latency presents a significant hurdle as it directly impacts the efficiency and scalability of blockchain networks. At its core, the problem lies in the finite capacity of blocks, leading to delays when the system experiences high transaction volumes. Traditional approaches to addressing latency have been limited in their effectiveness, often relying on temporary fixes or increasing block sizes, which can introduce further complications such as network congestion and decreased decentralization. Consequently, there exists a pressing need for innovative solutions capable of efficiently managing transaction throughput while minimizing latency in the block mining process.

Existing solutions in the field face formidable challenges in effectively addressing the latency issue within blockchain networks. One common approach involves adjusting block sizes to accommodate more transactions per block. However, this approach is inherently limited by network bandwidth and can lead to increased centralization consequences. Additionally, increasing block sizes does not fundamentally resolve the underlying latency problem and can exacerbate issues related to network scalability and resource consumption. Another strategy involves implementing off-chain scaling solutions, such as payment channels or sidechains, to alleviate congestion on the main blockchain. While these solutions offer temporary relief, they introduce complexity and potential security vulnerabilities, ultimately hindering the seamless operation of blockchain networks. Furthermore, the reliance on off-chain solutions undermines the core principles of decentralization and trust inherent to blockchain technology. Thus, despite efforts to mitigate latency issues, current solutions fall short of providing a comprehensive and sustainable approach to optimizing the block mining process and reducing time-to-add block.

Addressing these challenges necessitates the establishment of a system and method for data block analysis prioritization and routing via quantum machine learning. Such a framework allows for distributed ledger transactions to be routed to computer hardware that is available to mine and has adequate capacity to do so in a timely manner. Accordingly, a solution to the aforementioned shortcomings is presented herein and implements a methodology that involves transactions of a distributed ledger being clustered and prioritized by a clustering engine, to be tested in transaction placement schemas, in parallel, by a quantum computer. This will determine computer hardware that will mine the distributed ledger transactions most efficiently and thus prevent latency problems and/or the buildup of unverified transactions queued to be placed on the distributed ledger.

Indeed, the present disclosure includes a system, computer program product, and method that embrace data block mining analysis prioritization and routing via quantum machine learning. Distributed ledger transactions are retrieved. Telemetry data from computer hardware in a network may also be retrieved using an API call. Based on metadata from the transactions (i.e., the distributed ledger transactions), the transactions are clustered via a clustering engine. The clustering engine may also prioritize, via a priority score, the transactions. A machine learning model may then be introduced to generate transaction placement schemas of the computer hardware. From these schemas, simulations are performed for each schema using a quantum computer, which in some implementations is a photonic quantum computer. These schemas are tested using simulations in parallel with one another. Based on the results of the simulations, a prime schema is determined, which represents the ideal computer hardware to perform the mining for the transaction cluster, and thus may include "prime" computer hardware and a configuration thereof. This determination may be made based on the probability that a particular computer hardware can mine for the transaction in a given time period. The transaction cluster may then be routed to the prime computer hardware. As computer hardware availability is subject to change at any given moment, testing via simulation and probability determinations may be made at regular predetermined intervals or at a predetermined transaction volume threshold such that changes in routing may be determined and transactions routed accordingly. Once mined, or during mining, monitoring data may be collected and transmitted to the machine learning model to continuously train the machine learning model and adjust the weights of variables in order to improve subsequent performances.

What is more, the present disclosure provides a technical solution to a technical problem. As described herein, the technical problem includes the need for an effective solution to resolve latency problems in the mining of transactions in a distributed ledger across a network. The technical solution presented herein allows for the leveraging of machine learning models in conjunction with quantum computers to generate and test (i.e., simulate) multiple options for routing the transactions to miner nodes based on grouping similar transactions together. The present disclosure embraces an improvement over existing mining latency reduction solutions (i) with fewer steps to achieve the solution, thus reducing the amount of network resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving network resources, (iv) determining an optimal amount of resources that need to be used to implement the solution, thus reducing network traffic and load on existing network resources. Furthermore, the technical solution described herein uses a rigorous, computerized process to perform specific tasks and/or activities that were not previously performed. In specific implementations, the technical solution bypasses a series of steps previously implemented, thus further conserving network resources.

FIGS. 1A-1C illustrate technical components of an exemplary distributed computing environment 100 for data block analysis prioritization and routing via quantum machine learning, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one implementation includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an implementation of the disclosure. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some implementations, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates an exemplary machine learning model subsystem architecture 300, in accordance with an implementation of the disclosure. The machine learning subsystem 300 may include a data acquisition engine 302, data ingestion engine 310, data pre-processing engine 316, machine learning model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some implementations, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some implementations, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of network resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

As will be understood in view of the present disclosure, training data 318 may additionally, or alternatively, be provided from a third party, having been generated as synthetic data.

The machine learning model tuning engine 322 may be used to train a machine learning model to form a trained machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the machine learning model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the machine learning model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 338) live data 334 based on how similar they are to one another to solve exploratory challenges where little is known about the data, provide a description or label (e.g., $C\_1, C\_2 \ldots C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It shall be understood that the implementation of the machine learning subsystem 300 illustrated in FIG. 3 is exemplary and that other implementations may vary. As another example, in some implementations, the machine learning subsystem 300 may include more, fewer, or different components.

FIGS. 4A and 4B illustrate a process flow for data block analysis prioritization and routing via quantum machine learning, in accordance with an implementation of the disclosure. At FIG. 4A, the process may begin at block 402, where the system retrieves distributed ledger transactions. Transactions that are pending to be added to a ledger are typically stored in a data structure known as the "transaction pool" or "mempool" (memory pool). Thus, in some implementations, the system retrieves a plurality of distributed ledger transactions from the mempool. In some implementations, transactions that cannot be validated or are not included in a block within a predetermined timeframe may be removed from the mempool. These distributed ledger transactions may include transaction metadata that is retrieved by the system as a result. Examples of such metadata may include a unique identifier ("transaction ID"), along with a timestamp indicating when it was initiated or received. Additional metadata may include the transaction size, sender and recipient addresses, transaction status, and cryptographic signature for authenticity verification. Moreover, the transaction cost (i.e., "gas"), predetermined transaction cost limit, may be provided, especially in smart contract platforms like Ethereum. Other metadata may also be included, such as the type of transaction (e.g., financial transaction, smart contract interaction).

While it shall be appreciated that the present system is applicable to an implementation where a fixed number of transactions are in the mempool, the plurality of distributed ledger transactions may also be part of a distributed ledger transaction stream. The distributed ledger transaction stream may be a constant, or semi-constant influx of transactions into the mempool. Thus, the present system not only caters to scenarios with a predetermined quantity of transactions within the mempool but also accommodates the continuous flow of transactions inherent in a distributed ledger transaction stream.

At block 404, the system continuously retrieves a stream of telemetry data of computer hardware 504 in a network. The "computer hardware", as will be used herein, may refer to computer systems in the network that are configured to mine transactions. "Computer hardware" may refer to distributed mining pools, which are networks of individual "miners" collectively contributing their computational power to solve complex cryptographic puzzles and validate transactions on a blockchain network. In some implementations, "computer hardware" may refer to only one "miner" computer system. In other implementations, "computer hardware" may refer to 2, or 3, or 5, or 10, or 100 or more computer systems within a distributed mining pool.

As a result of computer hardware 504 being available and in operative communication to the system in the distributed network, the computer hardware 504 may contain telemetry data. This telemetry data may be geolocation of the computer hardware 504, IP address of the computer hardware 504, computing capability metadata of the computer hardware 504 (for example, amount of memory or processing power available), and/or computing hardware 504 availability temporal telemetry. Such telemetry data may be stored on a telemetry database, which may be updated on a recurring basis under conditions where new computer hardware 504 is added to the network or existing computer hardware 504 is modified.

The telemetry data may be retrieved by the system using an API call. Using the API as an intermediary between the system and the telemetry database, an API call retrieves telemetry data from the telemetry database. In implementations where the computer hardware 504 is a distributed mining pool having a plurality of computer systems, the telemetry data may be an aggregate of telemetry data of the computer systems. In implementations where the computer hardware 504 is a single computer system, the telemetry data may only be associated with the single computer system.

Having retrieved a plurality of distributed ledger transaction, at block 406 the system clusters these distributed ledger transactions based on the transaction metadata. These clusters 502 that are formed by implementing a clustering engine, which receives the transaction metadata and clusters 502 based on the metadata. For example, in some implementations, transaction IDs within proximity of one another may form a cluster 502. Additionally, or alternatively, distributed ledger transactions having a timestamp indicating when it was initiated or received may form a cluster 502 with other distributed ledger transactions having similar timestamps. Additionally, or alternatively, distributed ledger transactions having similar transaction sizes may form a cluster 502. Additionally, or alternatively, distributed ledger transactions having similar sender and/or recipient addresses may form a cluster 502. Additionally, or alternatively, distributed ledger transactions having similar transaction statuses may form a cluster 502. Additionally, or alternatively, distributed ledger transactions having similar cryptographic signatures for authenticity verification may form a cluster 502. Additionally, or alternatively, distributed ledger transactions having similar transaction costs or predetermined transaction cost limits may form a cluster 502. Additionally, or alternatively, distributed ledger transactions having similar type of transaction (e.g., financial transaction, smart contract interaction) may form a cluster 502.

In the process of clustering, the selection of metadata and the determination of cluster granularity may involve feature selection techniques, experimentation, and/or the setting of predetermined thresholds. In some implementations, feature selection techniques such as correlation analysis and principal component analysis may be used. Additionally, or alternatively, when determining the number of clusters 502, techniques like the elbow method and silhouette score may be used with a predetermined threshold guiding the number of clusters 502.

The clustering engine may also determine a priority score for at least one transaction cluster 502 of the plurality of transaction clusters 502. In some implementations, the clustering engine determines priority (i.e., which cluster 502 contains distributed ledger transactions which should be next in a queue to be supplied to computing hardware 504 for mining) and does not necessarily assign priorities to distributed ledger transactions within each cluster 502, but instead assigns a priority to each cluster 502 itself. The priority may be calculated as a result of predetermined weights given to each type of metadata collected by the clustering engine from the distributed ledger transactions. For example, transaction size and costs might be given higher weights if timely processing or cost efficiency is important. Conversely, transaction status and cryptographic signatures may be given lesser weights if they are less important.

At block 408 the system may generate, using a machine learning model, a predetermined number of transaction placement schemas of the computer hardware 504. It may be predetermined that the system should further evaluate the impact on timeliness of mining if a cluster 502 is sent to a particular computer hardware 504. For example, it may be predetermined that 2 of the plurality of computer hardware 504 are evaluated. Alternatively, 3, 5, 10, 15, 20, 50, 100 or any other number of computer hardware 504 may be evaluated, such as to determine which computer hardware 504 leads to a minimization of time and/or computing resources required to mine the distributed ledger in support of a distributed ledger transaction.

The machine learning model has been trained to identify computer hardware 504 that will minimize time and/or computing resources required to mine the distributed ledger, given the particular metadata associated with a cluster 502. For example, the machine learning model may be trained to understand that clusters 502 with distributed ledger transactions consisting of financial transactions may only be sent to computer hardware 504 within a particular jurisdiction or geographic area. As another example, the machine learning model may be trained to understand that clusters 502 with distributed ledger transactions consisting of large transaction sizes may need to be sent to computer hardware 504 that does not have scheduled downtime in the immediate future. Indeed, many such routing decisions may be learned by the machine learning model from tagged distributed ledger transactions being sent to computer hardware 504, and then continuous feedback from the mining occurring at the computer hardware 504 being provided back to the machine learning model as learning data, as will be described in greater detail herein.

Continuing now at block 410, the system may determine a "prime schema" from the generated schemas in block 408. The term "prime schema" refers to a selection of computer hardware 504 (i.e., prime computer hardware 504) and its associated configuration (i.e., prime computer hardware configuration) that has been determined by the machine learning model to be the computer hardware 504 most likely to minimize the mining time and/or computing resources. To do so, simulation testing for each of the schemas determined in block 408 will occur using a quantum computer. By nature of such quantum computer, these simulation tests for each of the schemas will be conducted in parallel (i.e., concurrently, at the same time) and thus will not delay the mining in any appreciable manner.

In some implementations, a photonic quantum computer may be implemented as the quantum computer. As used herein, a "photonic quantum computer" may refer to a computational system that uses the principles of quantum mechanics for performing information processing tasks. Unlike classical computers, which employ classical bits representing 0s and 1s, quantum computers leverage quantum bits, or qubits, which can exist in superposition states, allowing them to represent both 0 and 1 simultaneously. In the context of photonic quantum computing, the qubits are implemented using photons, which are quantum particles of light.

Photonic quantum computers rely on various techniques to manipulate and measure the quantum states of photons. One approach involves the use of linear optical elements, such as beam splitters and phase shifters, to perform quantum operations on photons. These operations enable the creation of entangled states, where the properties of multiple photons become correlated in a non-classical manner.

Moreover, photonic quantum computers often employ optical interferometers and detectors to perform measurements on the qubits. These measurements allow for the extraction of information encoded in the quantum states of the photons. One notable advantage of photonic quantum computers lies in their potential for scalability and low error rates. Photons are relatively immune to decoherence, the phenomenon where quantum information is lost due to interactions with the surrounding environment. This property makes photons attractive candidates for implementing qubits in quantum computing architectures.

After simulation, the results are provided as a probability, and specifically a probability that a given schema provides a processing time for adding a block to the distributed ledger that is the shortest (compared to the other schemas). This may involve outlining the processing steps for both adding a block and the alternative operations within each schema. The times for each step can be measured and modeled as probability distributions (e.g., exponential for network latency). Then, a Monte Carlo simulation could be run, where numerous iterations simulate the complete processing flow for adding a block and for alternative operations under their respective probability distributions. The probability of the block addition having the minimal processing time can be estimated by calculating the proportion of iterations where the block addition finishes first, from a probability output by parallel simulation testing, a prime schema comprising prime computer hardware 504 and a configuration of the prime computer hardware 504.

A schema determined to have the highest probability of the shortest processing time may be referred to herein as a "prime schema", which refers not only to the computer hardware 504 therein (i.e., "prime computer hardware"), but may also refer the configuration of said prime computer hardware 504 (i.e., "prime computer hardware configuration"). In some implementations, upon a determination of the prime schema, the system may form a smart contract between the prime computer hardware 504 and the at least one transaction cluster 502 of the plurality of transaction clusters 502. In other words, for the cluster 502 subject to the simulations which resulted in the prime schema, the cluster 502 and the corresponding computer hardware 504 may enter into a smart contract. The smart contract, upon receiving the transaction cluster 502, may perform a preliminary verification to ensure data integrity and completeness. The smart contract may then facilitate a conditional release of the transaction cluster 502 to the designated hardware 504. This conditional release is contingent upon verification of hardware 504 availability, confirmation of adequate processing resources, and potentially, successful execution of a test transaction. In some implementations, to guarantee execution, the smart contract holds a pre-determined cost in cryptocurrency or tokens to be released upon successful completion of the entire transaction cluster 502 by the designated hardware 504. In the event of hardware 504 malfunction or unforeseen errors during execution, the smart contract safeguards against partial execution by preventing further transaction release and returning any unprocessed transactions along with the associated cost.

Accordingly, at block 412, the system may rout, based on the prime schema, the at least one transaction cluster 502 of the plurality of transaction clusters 502 to the prime computer hardware 504. As such, each of the distributed ledger transactions within the cluster 502 are thereby routed to the prime computer hardware 504.

Turning now to FIG. 4B, at block 414, the prime computer hardware 504 mines the at least one transaction cluster 502 of the plurality of transaction clusters 502.

At block 416, the system may collect, via a monitoring engine, monitoring data of the at least one transaction cluster 502 of the plurality of transaction clusters 502. It shall be appreciated that the transaction placement schemas generated by the machine learning model at block 408 may benefit from ongoing training of the machine learning model. Accordingly, the performance of the prime schema during the mining process may be collected by a monitoring engine and information on its effectiveness can be fed back into the machine learning model to further optimize the schema generation process and generate schemas that are ultimately more effective at reducing mining time and/or computing resource usage. This closed-loop system can improve the generation of transaction placement schemas over time. The monitoring data may include a disposition of the transaction cluster 502 (e.g., whether the transactions therein were successfully added to the distributed ledger, the length of time it took to add the transactions to the distributed ledger, and so forth). Thus, to achieve the closed-loop system and continue to improve the machine learning model, the monitoring data may be transmitted to the machine learning model at block 418.

It shall be appreciated that the generation of schemas based on computer hardware telemetry data, the subsequent simulations, and ultimately a determination of a prime schema, hinges entirely on the availability of any given computer hardware 504. The availability of such hardware 504 often changes over time. For example, computer hardware 504 may be taken off-line (e.g., taken out of the network and/or turned off) in order to perform maintenance. In another example, computer hardware 504 may be subject to a large volume of data blocks to be appended to the distributed ledger, such that the computer hardware 504 has a significant queue which presents as an anomaly. The stream of computer hardware telemetry data may provide this information to the system. As such, it may be advantageous to periodically generate, using the machine learning model, additional transaction placement schemas, using a method such as that which was described with respect to block 408. Thus, the newly generated schemas inherently include any changes to the computer hardware 504.

Accordingly, at block 420, the system may determine, continuously at a predetermined interval, a new schema that includes new computer hardware 504 as a result of the computer hardware telemetry data having changed over time. It shall be appreciated, however, that the "new computer hardware" as identified in the schema determined in block 420 may be identical to that which was identified previously as the "prime schema."

Indeed, the system may once again generate a predetermined number of transaction placement schemas, using the machine learning model, of various computer hardware 504 as a result of the changing computer hardware telemetry data. Thereafter, the system may use the quantum computer to perform simulation testing in an identical manner to that which was performed in block 410, but instead of determining a "prime schema", the resulting schema with probability of the block addition having the minimal processing time will now be referred to as a "new schema.". The quantum computer may perform the parallel simulation testing and provide a "second probability output" and specifically a probability that a given schema provides a processing time for adding a block to the distributed ledger that is the shortest (compared to the other schemas). The schema determined to have the highest probability of the shortest processing time may be deemed the "new schema" upon which a cluster 502 is to be processed. The new schema may contain "new computer hardware" and a configuration of the new computer hardware 504.

In some implementations, the predetermined interval at which the process in block 420 occurs may be a predetermined time interval, such as every 30 seconds, 1 minute, 2 minutes, 5 minutes, 10 minutes, 30 minutes, 1 hour, 2 hours, 4 hours, 6 hours, 12 hours, 24 hours, 48 hours, and so forth.

Additionally, or alternatively, the system may also perform the process of block 420 upon a condition where transaction volume is above a predetermined threshold. The collection of monitoring data at the computer hardware 504 performing the mining and transmitting such monitoring data (as shown in blocks 416 and 418) can include metrics related to the blockchain being mined. Specifically, the monitoring data could include the transaction volume monitored on the receiving end (e.g., mining pool), the transaction volume being calculated by comparing a current counter value for a computer hardware 504 with a previously stored counter value, effectively determining the number of transactions received within a timeframe. This value may then be compared to a predetermined threshold set by the user. If the calculated transaction volume exceeds the threshold, the system may initiate the determination of the new schema in the manner set forth previously with respect to the determination of the new schema at a predetermined interval.

It shall be appreciated that in some implementation, regardless of the hardware 504 telemetry data, the schemas previously generated at block 408 may be temporarily stored (for example, in a buffer) and reused in the recurring process subject to additional simulation testing as described in block 410, instead of additional schemas being generated at each interval or transaction volume threshold.

FIG. 5 illustrates a graphical representation of data block mining analysis prioritization and routing via quantum machine learning, in accordance with an implementation of the disclosure. As shown in FIG. 5, transactions to be stored on the distributed ledger (i.e., to be mined) have been clustered into transaction cluster(s) 502. Transaction clusters 502 may be of various sizes and thus contain a different number of transactions within each cluster, depending on the transaction metadata and how the clustering engine performs clustering, as is discussed in detail herein with respect to block 406 of FIG. 4A.

The transaction mining routing 506 block in FIG. 5 represents routing activities such as those described with respect to block 412 of FIG. 4A, where routing to computer hardware 504 (for example, prime computer hardware) occurs based on the prime schema. Of course, subsequent routing to new computer hardware may occur if a new schema is determined, such as that which is described in block 420 of FIG. 4A. Prior to, or after the transaction mining routing, quantum optimization 508 may occur, such as the parallel simulation testing that occurs via the quantum computer and the determination of the prime schema based on results of said testing, as is described in detail in reference to block 410 of FIG. 4A.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for data block analysis prioritization and routing via quantum machine learning, the system comprising:
 a processing device;
 a non-transitory storage device containing instructions when executed by the processing device, causes the processing device to perform the steps of:

retrieving a plurality of distributed ledger transactions comprising transaction metadata;
retrieving, continuously, a stream of telemetry data of computer hardware in a network via an API call to a telemetry database, wherein the computer hardware comprises distributed mining pools;
clustering, based on the transaction metadata, the plurality of distributed ledger transactions into a plurality of transaction clusters using a clustering engine, wherein the clustering engine determines a priority score for at least one transaction cluster of the plurality of transaction clusters;
generating, using a machine learning model, a predetermined number of transaction placement schemas of the computer hardware;
determining, from a probability output by parallel simulation testing via a quantum computer, a prime schema comprising prime computer hardware and a configuration of the prime computer hardware; and
routing, based on the prime schema, the at least one transaction cluster of the plurality of transaction clusters to the prime computer hardware.

2. The system of claim 1, wherein the quantum computer comprises a photonic quantum computer.

3. The system of claim 1, wherein the instructions further cause the processing device to perform the steps of:
determining, continuously at a predetermined interval, from a second probability output by parallel simulation testing via the quantum computer, a new schema comprising new computer hardware and a configuration of the new computer hardware.

4. The system of claim 1, wherein the instructions further cause the processing device to perform the steps of:
determining, upon a condition where transaction volume is above a predetermined threshold, from a second probability output by parallel simulation testing via the quantum computer, a new schema comprising new computer hardware and a configuration of the new computer hardware.

5. The system of claim 1, wherein the instructions further cause the processing device to perform the steps of:
mining, at the prime computer hardware, the at least one transaction cluster of the plurality of transaction clusters;
collecting, via a monitoring engine, monitoring data comprising a disposition of the at least one transaction cluster of the plurality of transaction clusters; and
transmitting the monitoring data to the machine learning model for training.

6. The system of claim 1, wherein the plurality of distributed ledger transactions comprises a distributed ledger transaction stream.

7. The system of claim 1, wherein the telemetry data is at least one selected from the group consisting of: geolocation, IP address, computing capability metadata, and computing hardware availability temporal telemetry.

8. The system of claim 1, wherein the instructions further cause the processing device to perform the steps of:
forming, based on the prime schema, a smart contract between the prime computer hardware and the at least one transaction cluster of the plurality of transaction clusters.

9. A computer program product for data block analysis prioritization and routing via quantum machine learning, the computer program product comprising a non-transitory computer-readable medium comprising code causing an apparatus to:
retrieve a plurality of distributed ledger transactions comprising transaction metadata;
retrieve, continuously, a stream of telemetry data of computer hardware in a network via an API call to a telemetry database, wherein the computer hardware comprises distributed mining pools;
cluster, based on the transaction metadata, the plurality of distributed ledger transactions into a plurality of transaction clusters using a clustering engine, wherein the clustering engine determines a priority score for at least one transaction cluster of the plurality of transaction clusters;
generate, using a machine learning model, a predetermined number of transaction placement schemas of the computer hardware;
determine, from a probability output by parallel simulation testing via a quantum computer, a prime schema comprising prime computer hardware and a configuration of the prime computer hardware; and
route, based on the prime schema, the at least one transaction cluster of the plurality of transaction clusters to the prime computer hardware.

10. The computer program product of claim 9, wherein the quantum computer comprises a photonic quantum computer.

11. The computer program product of claim 9, wherein the code further causes the apparatus to:
determine, continuously at a predetermined interval, from a second probability output by parallel simulation testing via the quantum computer, a new schema comprising new computer hardware and a configuration of the new computer hardware.

12. The computer program product of claim 9, wherein the code further causes the apparatus to:
mine, at the prime computer hardware, the at least one transaction cluster of the plurality of transaction clusters;
collect, via a monitoring engine, monitoring data comprising a disposition of the at least one transaction cluster of the plurality of transaction clusters; and
transmit the monitoring data to the machine learning model for training.

13. The computer program product of claim 9, wherein the plurality of distributed ledger transactions comprises a distributed ledger transaction stream.

14. The computer program product of claim 9, wherein the telemetry data is at least one selected from the group consisting of: geolocation, IP address, computing capability metadata, and computing hardware availability temporal telemetry.

15. The computer program product of claim 9, wherein the code further causes the apparatus to:
form, based on the prime schema, a smart contract between the prime computer hardware and the at least one transaction cluster of the plurality of transaction clusters.

16. A method for data block analysis prioritization and routing via quantum machine learning, the method comprising:
retrieving a plurality of distributed ledger transactions comprising transaction metadata;
retrieving, continuously, a stream of telemetry data of computer hardware in a network via an API call to a telemetry database, wherein the computer hardware comprises distributed mining pools;
clustering, based on the transaction metadata, the plurality of distributed ledger transactions into a plurality of transaction clusters using a clustering engine, wherein the clustering engine determines a priority score for at least one transaction cluster of the plurality of transaction clusters;

generating, using a machine learning model, a predetermined number of transaction placement schemas of the computer hardware;

determining, from a probability output by parallel simulation testing via a quantum computer, a prime schema comprising prime computer hardware and a configuration of the prime computer hardware; and routing, based on the prime schema, the at least one transaction cluster of the plurality of transaction clusters to the prime computer hardware.

17. The method of claim 16, wherein the quantum computer comprises a photonic quantum computer.

18. The method of claim 16, further comprising:

determining, continuously at a predetermined interval, from a second probability output by parallel simulation testing via the quantum computer, a new schema comprising new computer hardware and a configuration of the new computer hardware.

19. The method of claim 16, further comprising:

mining, at the prime computer hardware, the at least one transaction cluster of the plurality of transaction clusters;

collecting, via a monitoring engine, monitoring data comprising a disposition of the at least one transaction cluster of the plurality of transaction clusters; and transmitting the monitoring data to the machine learning model for training.

20. The method of claim 16, wherein the telemetry data is at least one selected from the group consisting of: geolocation, IP address, computing capability metadata, and computing hardware availability temporal telemetry.

* * * * *